United States Patent [19]
Habermeier et al.

[11] 3,886,123
[45] May 27, 1975

[54] POLYESTERAMIDES BASED ON BIS-AMINOALKYL HYDANTOINS OR DIHYDROURACILS

[75] Inventors: Jurgen Habermeier, Pfeffingen; Walter Kunz, Basel, both of Switzerland

[73] Assignee: Ciba-Geigy Corporation, Ardsley, N.Y.

[22] Filed: Mar. 13, 1974

[21] Appl. No.: 450,932

[30] Foreign Application Priority Data
Mar. 27, 1973  Switzerland.......................... 4400/73

[52] U.S. Cl....... 260/75 N; 260/256.4 C; 260/309.5
[51] Int. Cl............................................. C08g 20/30
[58] Field of Search.................................. 260/75 N

[56] References Cited
UNITED STATES PATENTS
2,851,443   9/1958   Williams et al....................... 260/75
2,861,055   11/1958  Williams et al....................... 260/75
2,956,984   10/1960  Reynolds et al...................... 260/75

FOREIGN PATENTS OR APPLICATIONS
17,232     11/1960  Japan
1,574,410  7/1969   France

*Primary Examiner*—Melvin Goldstein
*Assistant Examiner*—N. Harkaway
*Attorney, Agent, or Firm*—Charles W. Vanecek

[57] ABSTRACT

Linear copolyesters containing amide groups are obtained by polycondensing certain dicarboxylic acid diamides which are obtained by reacting 1 mol of a N-heterocyclic-aliphatic diamine with 2 mols of terephthalic acid, isophthalic acid or amide-forming derivatives thereof, to a relative viscosity higher than 1.2, with terephthalic acid, isophthalic acid or polyester-forming derivatives and with alkanediols.

The new copolyesters containing amide groups are valuable engineering thermoplastic materials which can be easily processed and which yield moulded materials with good thermomechanical properties.

6 Claims, No Drawings

POLYESTERAMIDES BASED ON BIS-AMINOALKYL HYDANTOINS OR DIHYDROURACILS

The present invention relates to new, linear copolyesters based on terephthalic acid and/or isophthalic acid and on alkanediols containing certain dicarboxylic acid diamides as co-components, a process for the manufacture of the new copolyesters and the use of these copolyesters, which are valuable thermoplastic materials.

Thermoplastic polyesters composed of terephthalic acid and aliphatic diols, such as, for example, poly(ethyleneterephthalates) and poly(butyleneterephthalates), are known, as is their use in technology as "engineering thermoplastic" materials. These polyesters, from which it is possible to produce shaped particles with good mechanical properties, nevertheless also have disadvantages. Thus, in general the glass transition point or glass transition range of these polyesters, especially in the case of the poly(butyleneterephthalates), is very low, which is found to be a disadvantage in many technical applications of these polyesters, since the shaped articles manufactured from them lose their rigidity even at relatively low temperatures. A further disadvantage, especially in the case of the known poly(ethyleneterephthalates), lies in the fact that fairly high temperatures are necessary for their processing.

It is also known that the properties of the conventional polyalkylene terephthalates can be modified in a desired manner by the incorporation of aliphatic diamines. Thus American Patent Specification No. 2,925,405 has already suggested that such linear polyesters should be manufactured by polycondensing with alkanediols certain terephthalic acid diester-diamides which have been obtained by reacting 2 mols of dimethyl terephthalate with 1 mol of an alkylenediamine. The polyesters obtained by this process, which contain amide groups, still have, however, relatively high melting points with only a slight increase in the glass transition points or ranges.

It has now been found that new copolyesters with more advantageous properties are obtained if terephthalic acid, isophthalic acid or derivatives thereof which form polyesters are copolymerised with alkanediols mixed with a certain quantity of certain dicarboxylic acid diamide compounds. Compared both with the conventional polyalkylene terephthalates and also with the polyalkylene terephthalates which have been modified with aliphatic diamines, the copolyesters according to the invention are distinguished by higher glass transition temperatures and lower melting points or softening points, thus they have better thermomechanical properties with better processability.

The present invention therefore relates to new, linear, thermoplastic copolyesters which contain amide groups and are based on terephthalic acid and/or isophthalic acid and on alkanediols containing 2 to 10 carbon atoms, characterised in that they contain, as the co-component, 5–90 mol%, relative to the total molar quantity of the dicarboxylic acid components, of a dicarboxylic acid diamide radical of the formula I

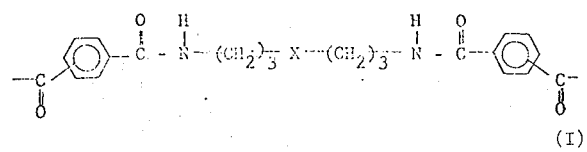

(I)

wherein the two carbonyl groups located on the aromatic ring are in the para- or meta-position to one another and X denotes an organic radical containing the grouping of the formula II

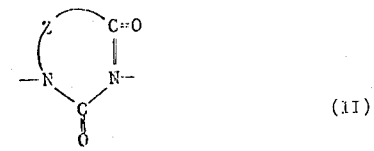

(II)

in which Z denotes an unsubstituted methylene or ethylene group or a methylene or ethylene group substituted by alkyl, cycloalkyl or phenyl.

For example, the radical Z in the formula II can denote a radical of the following formulae:

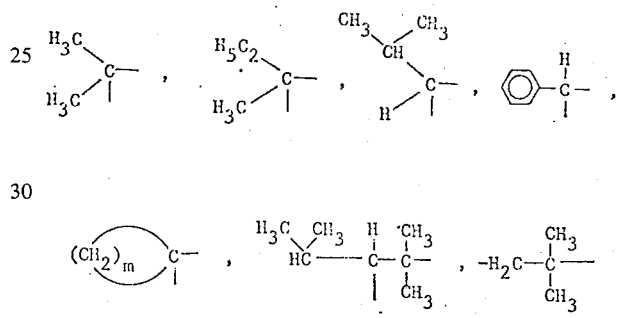

$m = 4$ or $5$.

The invention preferably relates to copolyesters, based on terephthalic acid and/or isophthalic acid and on alkanediols containing 2 to 6 carbon atoms, wherein the proportion of the co-component amounts to 5 – 75 mol% of a dicarboxylic acid diamide radical of the formula I and X in the formula I denotes a N,N-heterocyclic radical of the formula III

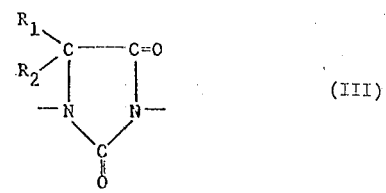

(III)

wherein $R_1$ and $R_2$ independently of one another each denote a hydrogen atom, an alkyl group with 1 – 4 carbon atoms or the phenyl group or conjointly denote the tetramethylene or pentamethylene group.

The new copolyesters containing amide groups are obtained by polycondensing, in a known manner, terephthalic acid, isophthalic acid or derivatives thereof which form polyesters mixed with 5 – 90 mol%, relative to the total molar quantity of the dicarboxylic acid components, of a dicarboxylic acid diamide compound of the formula IV

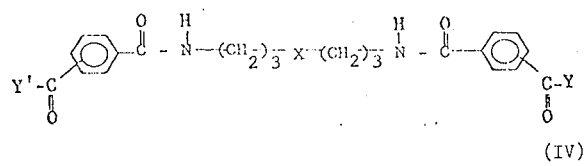

wherein the two carbonyl groups located on the aromatic ring are in the para- or meta-position to one another, Y and Y' independently of one another denote the hydroxyl group, the methoxy group or a chlorine atom, and X has the same meaning as in formula I, in approximately equimolar quantities with alkanediols containing 2 – 10 carbon atoms, in the presence of a catalyst, to a relative viscosity higher than 1.2 (specific viscosity higher than 0.2), measured at 30°C on a 1% strength solution consisting of 50 parts of phenol and 50 parts of tetrachloroethane.

Preferably, terephthalic acid, isophthalic acid or derivatives thereof which form polyesters are polycondensed mixed with 5 – 75 mol%, relative to the total molar quantity of the dicarboxylic acid components, of a dicarboxylic acid diamide compound of the formula IV wherein X denotes a N,N-heterocyclic radical of the formula III, with alkanediols containing 2 – 6 carbon atoms in the molecule.

The polyester-forming derivatives of terephthalic and isophthalic acid principally used in the process are the lower molecular dialkyl esters containing 1 to 4 carbon atoms in the alkyl group, but preferably the dimethyl esters. In addition, the acid dihalides, particularly the acid dichlorides, and the anhydrides of terephthalic acid and isophthalic acid are also suitable as polyester-forming derivatives.

The dicarboxylic acid diamide compounds of the formula IV are new compounds and can be obtained, for example, by the processes described in German Offenlegungsschrift 2,150,808 and in U.S. Pat. No. 2,925,405 by reacting 1 mol of a diamine of the formula V

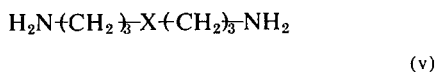

wherein X has the same meaning as in formula I, with 2 mols of terephthalic acid, isophthalic acid or derivatives thereof which form the carboxylic acid amide group.

Possible derivatives forming carboxylic acid amide groups are virtually the same derivatives of terephthalic and isophthalic acid as are used for the manufacture of the copolyesters. If, for example, the terephthalic or isophthalic acid dialkyl esters are used as starting products in the manufacture of the dicarboxylic acid diamide compound of the formula IV, the former are advantageously used in a 1 – 5-fold molar excess. The reaction temperatures in this process are between 20° and 250°C. If terephthalic or isophthalic acid monomethyl ester monochloride is used as the starting substance, it is preferably reacted with the diamine of the formula V in a molar ratio of 2 : 1 in the temperature range of 0° – 100°C.

The diamines of the formula V which are suitable for the manufacture of the dicarboxylic acid diamide compounds of the formula IV, are known compounds and their manufacture is described, for example, in British Patent Specifications Nos. 1,282,297; 1,278,449; 1,277,605 and 1,275,810.

Suitable diamines of the formula V containing one N,N-heterocyclic grouping of the formula II correspond to the general formula VI

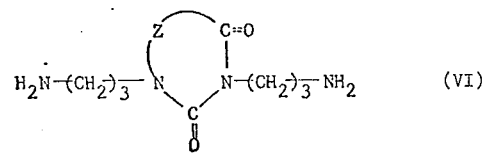

wherein Z has the same meaning as in formula II. The following may be mentioned as examples of representatives of this class of compound: 1,3-di-(γ-aminopropyl)-5,5-dimethylhydantoin, 1,3-di-(γ-aminopropyl)-5-methyl-5-ethylhydantoin, 1,3-di-(γ-aminopropyl)-5-methylhydantoin, 1,3-di-(γ-aminopropyl)-5-ethylhydantoin, 1,3-di-(γ-aminopropyl)-5-isopropylhydantoin, 1,3-di-(γ-aminopropyl)-hydantoin, 1,3-di-(γ-aminopropyl)-5,5-cyclopentamethylenehydantoin (= 1,3-di-(γ-aminopropyl)-1,3-diaza-spiro(4.5)decane-2,4-dione), 1,3-di-(γ-aminopropyl)- 5,5-cyclotetramethylenehydantoin (= 1,3-di-(γ-aminopropyl)-1,3-diaza-spiro(4.4)nonane-2,4-dione), 1,3-di-(γ-aminopropyl)-5,5-dimethyl-5,6-dihydrouracil and 1,3-di-(γ-aminopropyl)-6-methyl-5,6-dihydrouracil.

Preferably, diamines are used for the manufacture of the dicarboxylic acid diamide compounds of the formula IV, which correspond to the following formula VII

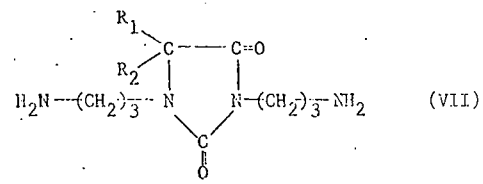

wherein $R_1$ and $R_2$ independently of one another each denote a hydrogen atom, an alkyl group with 1–4 carbon atoms or the phenyl group or wherein $R_1$ and $R_2$ conjointly denote the tetramethylene or pentamethylene radical.

In addition, possible diamines for the manufacture of the dicarboxylic acid diamide compounds of the formula IV are also those containing the N,N-heterocyclic grouping of the formula II twice and corresponding to the following formula VIII

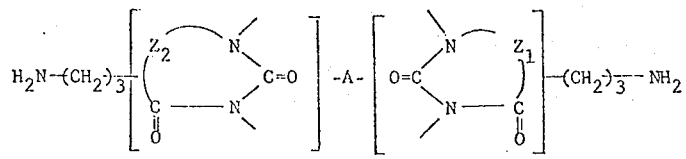

(VIII)

wherein $Z_1$ and $Z_2$ are identical or different and have the same meaning as Z in the formula II and A represents a divalent aliphatic, cycloaliphatic or araliphatic radical, preferably an alkylene radical up to 12 carbon atoms or an alkylene radical which is interrupted by ether oxygen atoms or by ester groups.

The following may be mentioned, for example, as examples of such diamines: 1,1'-methylene-bis-(3-γ-aminopropyl)-5-isopropylhydantoin, 1,1'-methylene-bis-(3-γ-amino-propyl)-5,5-dimethylhydantoin, 1,6-bis-[1'-(γ-aminopropyl)-5,5'-dimethylhydantoinyl-3'[-n-hexane and β,β'-bis-[1-(3'-aminopropyl)-5,5-dimethylhydantoinyl-3]-diethyl ether.

The new copolyesters can be manufactured by various known processes, for example by solution condensation or azeotropic condensation, by interfacial, melt or solid phase condensation and by a combination of these methods, depending on the starting compounds and reaction catalysts used.

The new copolyesters are preferably manufactured by esterifying or transesterifying terephthalic acid, isophthalic acid or lower molecular dialkyl esters thereof, preferably the dimethyl esters, mixed with the dicarboxylic acid diamides of the formula IV and the alkanediols, at 150°–220°C in an inert atmosphere, for example a nitrogen atmosphere, in the presence of catalysts and with simultaneous removal of the water or alkanol formed, and subsequently carrying out the polycondensation at 200°–270°C and under reduced pressure in the presence of certain catalysts, until the polycondensates have the desired viscosity.

In the manufacture of copolyesters by this process, the alkanediols are preferably used in excess, so that essentially monomeric alkanediol esters of the two dicarboxylic acid components are obtained after the esterification or transesterification reaction and these are then polycondensed in the presence of a polycondensation catalyst and whilst distilling off the excess alkanediol in vacuo.

Inorganic or organic acids, for example sulphuric acid or p-tolunesulphonic acid, or metal compounds which are also suitable as transesterification catalysts, can be used in a known manner as esterification catalysts.

As some catalysts preferentially accelerate the transesterification and others preferentially accelerate the polycondensation, it is advantageous to use a combination of several catalysts. Examples of suitable transesterification catalysts are the oxides, salts or organic compounds of the metals calcium, magnesium, zinc, cadmium, manganese and cobalt. The metals as such or the alloys prepared from them can also be used as catalysts. The polycondensation, on the other hand, is preferentially catalysed by lead, titanium, germanium and particularly antimony or compounds thereof. These catalysts can be added together or separately, that is to say before and after the esterification or transesterification of the reaction mixture. These catalysts are employed in quantities of about 0.001 to 1.0 per cent by weight, relative to the dicarboxylic acid components.

The new copolyesters can also be manufactured by condensing the starting compounds in the melt until a certain viscosity is reached, then granulating the polycondensate, for example with the aid of an underwater granulator, drying the granules and then subjecting them to a solid phase condensation, a vacuum, and temperatures below the melting point of the granules, being used. Higher viscosities of the polyesters are also achieved thereby.

Another process for the manufacture of the new copolyesters consists of polycondensing the terephthalic acid dihalides or isophthalic acid dihalides, preferably the acid dichlorides, mixed with the dicarboxylic acid dichloride or dicarboxylic acid monomethyl ester monochloride of the dicarboxylic acid diamide of the formula IV and with the alkanediols, in a solvent and in the presence of a basic catalyst in the temperature range of 0° to 100°C with elimination of hydrogen halide and whilst distilling off the methanol which may be formed. Tertiary amines or quaternary ammonium salts are preferably used as basic catalysts. The proportion of the basic catalyst can be from 0.1 to 20 mol %, relative to the acid halides. Such condensations can also be carried out in the melt, without using a solvent.

The polycondensation reaction is carried out until the copolyesters have a relative viscosity higher than 1.2 (specific viscosity higher than 0.2). The reaction times are about 30 minutes to several hours, depending on the nature of the catalyst used and the size of the batch. After removal from the reaction vessel, the polyester melt obtained is granulated or shredded in the customary manner.

The polycondensation reaction can also be carried out discontinuously, it being possible to take all the remaining known measures, such as the addition of inert fillers, flame-proofing additives, pigments and the like, already during the last stages of condensation, for example in the solid phase condensation or at the end of the melt condensation.

When working up the polyester melt or even before the polycondensation reaction, it is possible to add inert additives of all kinds to the reaction mass, such as, for example, fillers, reinforcing materials, especially glass fibres, inorganic or organic pigments, optical brighteners, delustering agents and flameproofing or flame-retarding additives.

Depending on the starting materials used, the copolyesters according to the invention have predominantly crystalline or predominantly amorphous zones. Unless they contain coloured additives, the new copolyesters are colourless to pale yellow and are hard, thermoplastic materials from which moulded materials with valuable thermo-mechanical properties can be manufactured by the customary moulding processes, such as casting, injection moulding and extrusion.

The new copolyesters are particularly suitable for use as "engineering plastic" materials which are suitable for the manufacture of shaped articles, such as cogwheels, containers for chemicals or food, machine parts and parts of apparatus, foils, sheets, films and hot-melt adhesives and also for the manufacture of semifinished products which can be machined.

The copolyesters prepared in the examples which follow are characterised more exactly by means of the following characteristic values:

The copolyesters are characterised by those morphological changes which are measured by means of differential thermo-analysis on a sample which is heat-treated for 3 minutes at 30°C above the melting point or softening point and is then rapidly chilled. The chilled sample is heated at a heating-up speed of 16°C/minute by means of a "DSC-2" differential calorimeter of Messrs. Perkin-Elmer. The glass transition range (Tg) is determined from the thermogram of the sample as the range in the thermogram where the specific heat increases suddenly. The specific viscosity (relative viscosity −1) of the polycondensates is determined at 30°C on solutions of 1 g of copolyester in 100 ml of a mixture consisting of equal parts of phenol and tetrachloroethane. The softening point is determined on a microscope with a heated stage at a heating-up speed of 15°C/minute, a cross being formed from 2 filaments and the softening point being designated as the temperature at which the sharp angles of the cross disappear. The softening points can also be determined by means of the Kofler bench.

PREPARATION OF THE DICARBOXYLIC ACID DIAMIDE COMPOUNDS

Example A:
N,N'-bis-(4-carbomethoxybenzoyl)-1,3-di-(γ-aminopropyl)-5,5-pentamethylenehydantoin A solution, cooled to 5°C, of 102.5 g of terephthalic acid monomethyl ester monochloride (0.515 mol) in 1.36 litres of benzene is intensively stirred in a laboratory glass stirring apparatus fitted with a reflux condenser, thermometer and dropping funnel. A solution of 72.5 g of 1,3-di-(γ-aminopropyl)-5,5-pentamethylenehydantoin (0.25 mol) and 70 of triethylamine (0.5 mol) dissolved in 300 ml of benzene is added dropwise over the course of 1.5 hours to the above solution with external cooling by means of ice water. The temperature of the reaction mixture rises meanwhile to 18°–19°C and a colourless suspension is formed. After the dropwise addition, the mixture is stirred for 1 hour at room temperature and then for a further 1.5 hours at 60°–80°C. The reaction mixture is then cooled.

The precipitate is filtered off and 3 litres of ether are added to the filtrate. The product which separates is triturated with petroleum ether to give a powder and is dried. A further quantity of the product is obtained by concentrating the ether solution to 400 ml. This quantity also is converted into a crystalline mass by trituration with petroleum ether. Total yield 150.6 g (theory: 152 g). The product melts at 60°–62°C and its elementary analysis yields the following values for $C_{32}H_{38}N_4O_8$:

| found | calculated |
|---|---|
| 63.5% C | 63.33% C |
| 6.7% H | 6.31% H |
| 20.8% O | 21.09% O |
| 8.9% N | 9.23% N |

The product corresponds to the following formula

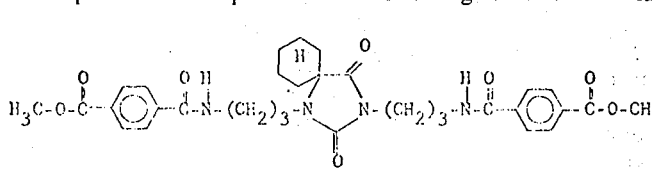

Example B:
N,N'-bis-(4-carbomethoxybenzoyl)-1,3-di-(γ-aminopropyl)-5,5-dimethylhydantoin A 95% strength solution of 127.8 g (0.5 mol) of 1,3-di-(γ-aminopropyl)-5,5-dimethylhydantoin and 140 ml of triethylamine (1.0 mol) in 300 ml of benzene and 50 ml of acetone is added with stirring over the course of 2 hours at 5°–10°C to a solution of 205 g (1.03 mols) of terephthalic acid monomethyl ester monochloride in 2.75 litres of benzene. The mixture is then stirred for a further hour at 75°–78°C. After cooling, 1.2 litres of ether are added, the precipitated triethylamine hydrochloride is filtered off and the clear solution is concentrated to dryness. 301 g of the crude product are obtained as a resinous, light brown substance.

For purification it is dissolved in 500 ml of chloroform and the solution is extracted with 3 times 150 ml of water. After concentrating the chloroform solution to dryness, the product is dried to a constant weight at 100°C/0.4 mm Hg. 280 g of a clear, brittle product are obtained (theory: 283.3 g).

The elementary analysis gives, for $C_{29}H_{34}N_4O_8$,

| found | calculated |
|---|---|
| 61.6% C | 61.5% C |
| 6.3% H | 6.1% H |
| 9.1% N | 9.9% N |

The product corresponds to the formula

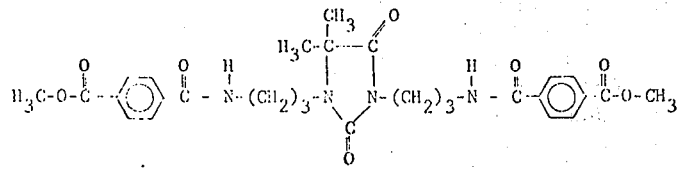

Example C
N,N'-bis-(4-carbomethoxybenzoyl)-ββ'-di-[1-(γ-aminopropyl)-5,5-dimethylhydantoinyl-3]-diethyl ether 81.8 g. (0.412 mol) of terephthalic acid monomethyl ester monochloride in 1.1 litres of benzene are reacted in accordance with Example B with 98 g (0.2 mol) of 90% strength ββ'-bis-[1-(γ-aminopropyl)-5,5-dimethylhydantoinyl-3]-diethyl ether in the presence of 56 ml of triethylamine (0.4 mol) in 120 ml of benzene and 20 ml of acetone.

The reaction is carried out and the product is worked up as described in Example B and 153 g of the crude dicarboxylic acid diamide are obtained as a light brown, brittle product. Purification is carried out by washing in accordance with Example B. After concentration and drying, 144.6 g (94.6% of theory) of the desired dicarboxylic acid diamide are obtained, which is a clear, resinous substance. Elementary analysis calculated on $C_{38}H_{48}N_6O_{11}$ yields:

| found | calculated |
|---|---|
| 60.4% C | 59.7% C |
| 6.5% H | 6.3% H |

The product corresponds to the following formula:

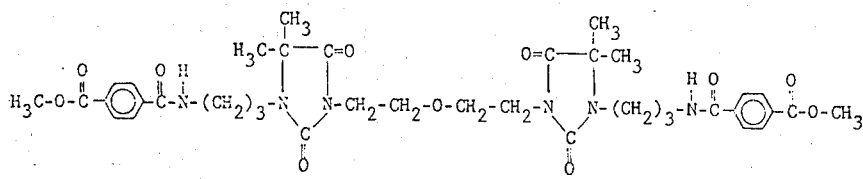

Example D
N,N'-bis-(4-carbomethoxybenzoyl)-1,3-di-(γ-aminopropyl)-5,5-dimethyl-5,6-dihydrouracil A solution of 128.2 g (0.5 mol) of 1,3-di-(γ-aminopropyl)-5,5-dimethyl-5,6-dihydrouracil and 140 ml of triethylamine (1.0 mol) in 300 ml of benzene and 50 ml of dioxane is added to a solution of 205 g (1.03 mols) of terephthalic acid monomethyl ester molochloride in 2.75 litres of benzene.

The reaction is carried out and the reaction mixture is worked up and the product is purified in accordance with Example B. 209.9 g (72.3% of theory) are obtained of a pale, clear product, with a softening point approximately at room temperature. The product of the empirical formula $C_{30}H_{34}N_4O_8$ has a C content of 62.4% (calculated 62.3%) and corresponds to the following formula

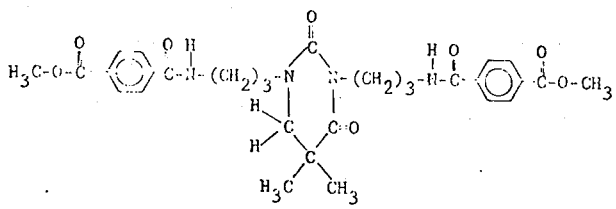

PREPARATION OF COPOLYESTERS CONTAINING AMIDE GROUPS

Example 1: Copolyesters containing 20 mol % of the dicarboxylic acid diamide according to Example A The following mixture is charged to a small glass polycondensation apparatus, fitted with a downward condenser, $N_2$-flushing, a thermometer and a stirrer with a powerful stirring action: 15.54 g (0.08 mol) of DMT (dimethyl terephthalate), 12.14 g (0.02 mol) of dicarboxylic acid diamide from Example A, 90.1 g (1.0 mol) of butane-1,4-diol and 0.1 ml of tetraisopropyl orthotitanate.

For the transesterification, this mixture is stirred at 150°C. Over the course of 2 hours the reaction temperature is raised to 190°C, methanol distilling off. The temperature is then raised to 220°C over the course of a further 2 hours, the reaction mixture turning into a pale yellow, clear melt. The excess of butanediol is now distilled off at 220°–245°C by applying a partial vacuum and stirring and the polycondensation is started. The temperature of the melt is then raised to 270°C, the vacuum is brought up to 0.2 mm Hg and the melt is stirred for a further hour under these conditions. Nitrogen is then passed into the apparatus and the copolyester is cooled down to room temperature.

A partly crystalline, practically colourless copolyester with the following data is obtained:

| | |
|---|---|
| Relative viscosity: | 1.86 |
| Softening point (Kofler) | 165°C |
| Melting point (DSC) | 192°C |
| Crystal transition temperature (DSC) | 102°C |
| Glass transition temperature (DSC) | 53–77°C |

Example 2: Copolyester containing 75 mol % of dicarboxylic acid diamide according to Example B and 50 mol % of decane-1,10-diol The following mixture is submitted to a polycondensation in an apparatus in accordance with Example 1: 4.85 g (0.025 mol) of DMT, 42.4 g (0.075 mol) of dicarboxylic acid diamide in accordance with Example B, 8.7 g of dodecane-1,10-diol, 144 g of butane-1,4-diol and 0.1 ml of tetraisopropyl orthotitanate. Temperature/time programme:

12 hours/150 → 200°C/$N_2$/normal pressure
4 hours/200 → 225°C/$N_2$/760 → 15 mm Hg
1 hour/225 → 225°C/15 mm Hg → 0.3 mm Hg
1 hour/255 → 260°C/0.3 mm Hg.

The copolyester thus obtained is a light brown, amorphous material with the following properties:

| | |
|---|---|
| Relative viscosity | 1.42 |
| Softening point (Kofler) | 165°C |
| Glass transition temperature (DSC) | 66–77°C |

Example 3: Copolyester containing 90 mol % of dicarboxylic acid diamide according to Example C The following mixture of substances is transesterified and polycondensed in an apparatus in accordance with Example 1 and according to the temperature/time programme described in Example 2: 1.14 g (0.01 mol) of DMT, 68.8 g of dicarboxylic acid diamide in accordance with Example C, 162 g of butane-1,4-diol and 0.2 ml of tetraisopropyl orthotitanate.

A hard, light brown copolyester with the following data is obtained:

| | |
|---|---|
| Relative viscosity | 1.28 |
| Softening point (Kofler) | approx. 140°C |
| Glass transition temperature (DSC) | 63–73°C |

Example 4: Copolyester containing 25 mol % of dicarboxylic acid diamide according to Example D A mixture of: 14.55 g (0.075 mol) of DMT, 14.5 g (0.025 mol) of dicarboxylic acid diamide in accordance with Example D, 74.4 g (1.2 mols) of ethylene glycol, 0.012 g of manganese acetate, 0.012 g of zinc acetate and 0.02 g of antimony trioxide is transesterified and polycondensed in accordance with the following programme:

10 hours/150 → 200°C/N₂/normal pressure
2 hours/200 → 225°C/760 → 15 mm Hg
2 hours/225 → 250°C/15 mm Hg → 0.3 mm Hg.

A brownish, hard copolyester with the following properties is obtained:

| | |
|---|---|
| Relative viscosity | 1.55 |
| Softening point (Kofler) | approx. 160°C |
| Glass transition temperature (DSC) | 81°C |

Comparison Example 1: Polyester amide in accordance with DT-OS 2,150,808, Example 13, from N,N'-bis-(p-carbobutoxybenzoyl)-dodecamethylenediamine and dodecane-1,12-diol.

For comparison, a fibre polyester was prepared as follows from regular polyester amides: 87.33 g (0.143 mol) of N,N'-bis-(p-carbobutoxybenzoyl)-dodecamethylenediamine (prepared according to Example 1, DOS 2,150,808) are de-gassed and are treated, under nitrogen, with 72.33 g of 1,12-dodecanediol +0.143 ml of a 0.2% solution of tetrabutyltitanium in butanol. The mixture is treated as follows, whilst stirring:

5 hours at 195°C    205°C/N₂/normal pressure
1 hour at 205°C     235°C/N₂/750 mm Hg     0.5 mm Hg
1 hour at 235°C     272°C/N₂/0.3 mm Hg.

The pale, partly crystalline polyester obtained has a relative viscosity of 2.44 (measured in phenol/tetrachloroethane at 30°C). The product obtained is therefore identical with the product described in DT-OS 2,150,808. Values were determined for the following properties:

| | | |
|---|---|---|
| Glass transition range Tg (°C) as such | = | 40–49 |
| Glass transition range Tg (°C) after heat-treatment | = | 37–56 |
| Melting point | = | 193°C |
| Softening point (Kofler) | = | 192°C. |

Although this pure, regular polyester amide has good properties as a fibre polyester, it is, nevertheless, by virtue of its low Tg value not usable as a high grade "engineering plastics" material.

Comparison Example 2: Copolyester containing 25 mol % of N,N'-bis-(4-carbomethoxybenzoyl)-ethylenediamine, DMT and 1,4-butanediol.

The following mixture is reacted and polycondensed in accordance with Example 1: 125.2 g (0.645 mol) of DMT, 82.6 g (0.215 mol) of N,N'-bis-(4-carbomethoxybenzoyl)-ethylenediamine, 180 g (2.0 mols) of butane-1,4-diol and 0.099 g of tetraisopropyl orthotitanate.

The process is carried out as described in Example 1 and a light grey, partly crystalline copolyester with the following properties is obtained:

| | |
|---|---|
| Relative viscosity | 1.68 |
| Softening point (Kofler) | 215°C |
| Glass transition temperature | 40–49°C |

The following table summarises the properties of polyesters compared in the comparison examples with the most nearly comparable copolyesters according to the invention.

| | Polyester amide in accordance with Comparison Example 1 | Copolyester in accordance with Example 2 | Copolyester in accordance with Comparison Example 2 | Copolyester in accordance with Example 1 |
|---|---|---|---|---|
| ηrel. | 2.44 | 1.42 | 1.68 | 1.86 |
| S.p. (°C) | 200 | 165 | 215 | 165 |
| Tg (°C) | 37 – 49 | 66 – 77 | 40 – 49 | 53 – 77 |

We claim:

1. A linear, thermoplastic copolyester which contains amide groups and is based on terephthalic acid and/or isophthalic acid and alkanediols containing 2–10 carbon atoms, characterised in that it contains, as the co-component, 5–90 mol %, relative to the total molar quantity of dicarboxylic acid components, of a dicarboxylic acid diamide radical of the formula I

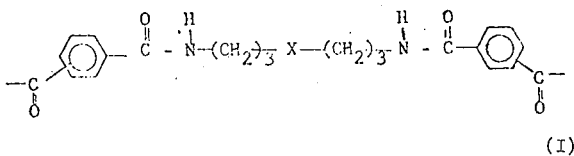

(I)

wherein the two carbonyl groups located on the aromatic ring are in the para- or meta-position to one another and X denotes an organic radical containing the grouping of the formula II

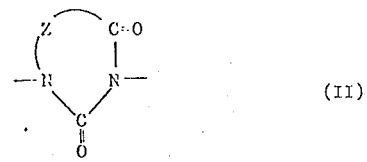

(II)

in which Z denotes an unsubstituted methylene or ethylene or a methylene or ethylene which is substituted by alkyl, cycloalkyl or phenyl.

2. A copolyester according to claim 1 based on terephthalic acid and/or isophthalic acid and alkanediols containing 2–6 carbon atoms, characterised in that it contains, as the co-component, 5–75 mol % of a dicarboxylic acid diamide radical of the formula I wherein X denotes a N,N-heterocyclic radical of the formula III

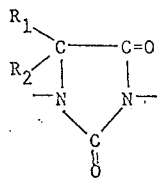

(III)

wherein $R_1$ and $R_2$ independently of one another each denote a hydrogen alkyl with 1–4 carbon atoms, phenyl or conjointly denote tetramethylene or pentamethylene.

3. A copolyester according to claim 1, characterised in that X in the formula denotes 5,5-pentamethylenehydantoin, 5,5-dimethylhydantoin or 5,5-dimethyl-5,6-dihydrouracil.

4. A copolyester according to claim 1, characterised in that X in the formula I denotes a radical of the formula

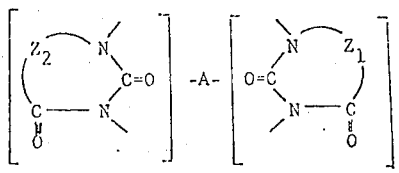

wherein $Z_1$ and $Z_2$ are identical or different and have the same meaning as Z in the formula II and A represents a divalent aliphatic, cycloaliphatic or araliphatic radical.

5. A copolyester according to claim 4, characterised in that A in the formula denotes an alkylene up to 12 carbon atoms which may be interrupted by ether oxygen atoms.

6. A copolyester according to claim 1, characterised in that X denotes bis-[5,5-dimethylhydantoinyl-3]-diethyl ether.

* * * * *